(12) United States Patent
Krug-Kussius

(10) Patent No.: US 9,574,581 B2
(45) Date of Patent: Feb. 21, 2017

(54) BRAKE VALVE AND HYDROSTATIC DRIVE SYSTEM THEREWITH

(71) Applicant: Robert Bosch GmbH, Stuttgart (DE)

(72) Inventor: Karl Krug-Kussius, Karsbach (DE)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 14/170,755

(22) Filed: Feb. 3, 2014

(65) Prior Publication Data

US 2014/0216024 A1 Aug. 7, 2014

(30) Foreign Application Priority Data

Feb. 5, 2013 (DE) .................. 10 2013 201 864

(51) Int. Cl.
| | |
|---|---|
| *F15B 11/044* | (2006.01) |
| *F15B 13/02* | (2006.01) |
| *F16H 61/4157* | (2010.01) |
| *F15B 13/042* | (2006.01) |
| *F16K 31/383* | (2006.01) |
| *F16K 17/10* | (2006.01) |

(52) U.S. Cl.
CPC ......... *F15B 13/026* (2013.01); *F15B 11/0445* (2013.01); *F15B 13/042* (2013.01); *F16H 61/4157* (2013.01); *F16K 17/10* (2013.01); *F16K 31/383* (2013.01); *Y10T 137/7762* (2015.04)

(58) Field of Classification Search
CPC .................. F15B 11/0445; F16H 61/4157
See application file for complete search history.

(56) References Cited

U.S. PATENT DOCUMENTS

| | | | | |
|---|---|---|---|---|
| 3,732,037 | A * | 5/1973 | Carlson | 417/217 |
| 4,571,941 | A * | 2/1986 | Aoyagi et al. | 60/466 |
| 7,798,173 | B2 * | 9/2010 | Feigel | 137/630.14 |

FOREIGN PATENT DOCUMENTS

DE 100 30 137 B4 9/2008

OTHER PUBLICATIONS

Sauer Danfoss; IBF Integrated Brake Function Data Sheet; DKMH.PD.342.A2.02 520L0678 Rev A; Feb. 2004; 2 Pages.

* cited by examiner

*Primary Examiner* — F. Daniel Lopez
(74) *Attorney, Agent, or Firm* — Maginot, Moore & Beck LLP

(57) ABSTRACT

A brake valve is insertable into a working line of a hydrostatic travel drive. The brake valve has a main stage with a first port connected to a variable displacement pump of the drive system and a second port connected to a motor of the drive system. The main stage has a slide piston positionable in a valve bore. In a freewheeling position, a connection is maximally open with minimal throttling between the two ports. In pressure-reducing positions, a regulable, throttled connection is open from the second to the first port to brake the motor. In pressure-limiting positions, a regulable, throttled connection is open from the first to the second port to begin to throttle a pressure medium flow from the variable displacement pump to a pressure protection mechanism. The positions lie on a center line of the main stage along which the slide piston is movable.

16 Claims, 7 Drawing Sheets

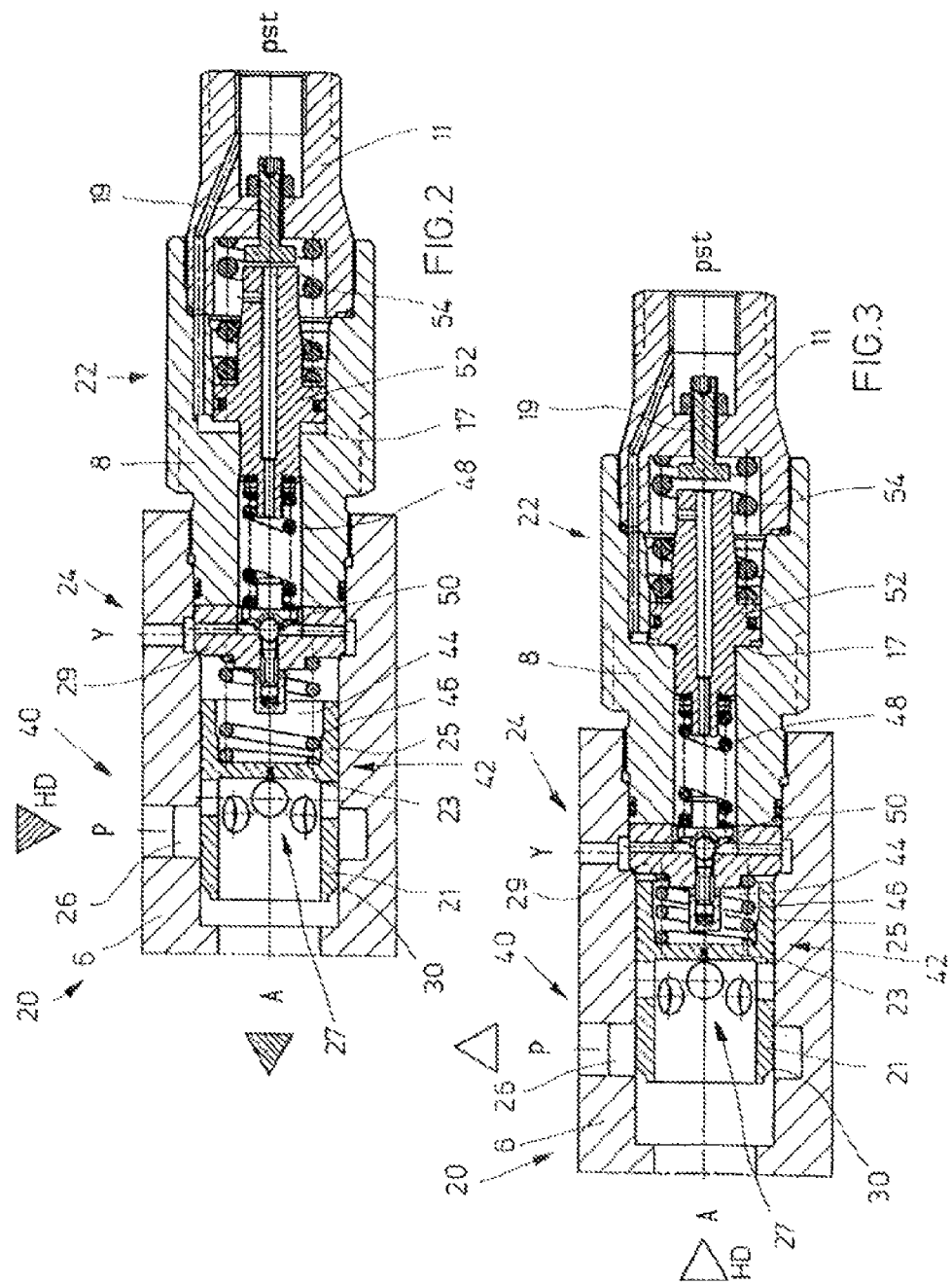

BRAKE VALVE AND HYDROSTATIC DRIVE SYSTEM THEREWITH

This application claims priority under 37 U.S.C. §119 to patent application number DE 10 2013 201 864.9, filed on Feb. 5, 2013 in Germany, the disclosure of which is incorporated herein by reference in its entirety.

BACKGROUND

The disclosure relates to a brake valve, in particular a driving brake valve, according to the description below, and to a hydrostatic drive system with a closed circuit which has a brake valve of this type.

The document "IBF Integrated Brake Function" by Sauer Danfoss, dated February 2004, describes a brake valve for the return of a hydrostatic drive system, the pump of which is driven by a diesel motor. If, for example, an agricultural machine driven by the drive system rolls down a slope and has to be braked, a throttle function of the brake valve is activated such that the driving motor can be supported thereon. For this purpose, said brake valve is used in particular if the diesel motor which is entrained via the pump of the drive system can not apply the required braking torque.

A hydrostatic drive system for a vehicle is also known from DE 100 30 137 B4, in which a pump and two hydraulic motors are arranged in a closed hydraulic circuit. A respective pressure control valve with an adjustable pressure-limiting function and with a nonreturn valve function is arranged in the two working lines, which can each serve as an inlet and as an outlet. The pressure control valve situated in the inlet opens up the inlet cross section via the nonreturn valve, while the pressure control valve situated in the outlet is effective with its adjustable pressure-limiting function. During the normal driving mode, the pressure control valve mentioned last opens up the outlet cross section and, for example in the event of a descent (the vehicle and the hydraulic motor hurrying on ahead), begins to throttle the volumetric flow of pressure medium in the outlet, and therefore the pressure against which the hydraulic motor has to operate rises and said hydraulic motor is braked.

In the known solution, the adjustment pressure of the pressure-limiting valve is adjusted electrically or electro-hydraulically, for example depending on the rotational speed of an internal combustion engine driving the pump, wherein a minimum adjustment pressure of the pressure-limiting valve is determined by the pretensioning of a spring.

SUMMARY

The disclosure is based on the object of providing a double-action brake valve for a drive system for a vehicle, said brake valve permitting a normal driving mode with a minimum loss in the return, a braking mode with regulable throttling in the return and, in addition, regulable throttling in the return on a reversal of the flow direction. The reversal can take place by complete pivoting or locking of a variable displacement pump of the drive system by the vehicle driver.

This object is achieved by a brake valve or retarder valve with the features described below and by a drive system with a valve of this type according to the description below.

The brake valve disclosed herein is preferably a driving brake valve and is configured to be inserted in the form of a retarder valve into a working line of a hydrostatic drive system with a closed or open circuit. The drive system has a variable displacement pump and at least one motor. The working line in question serves in a normal driving mode as a return line from the motor to the variable displacement pump. The brake valve disclosed herein can therefore be inserted into the pressure medium flow of the return line and has a main stage which has a first main port, which is connectable to the variable displacement pump, and a second main port, which is connectable to the motor. According to the disclosure, the main stage has a slide piston which can take up a freewheeling position or main position in a valve bore of the main stage, in which a connection is maximally open with minimal throttling between the two main ports. Furthermore, in a region of the valve bore that is adjacent to the freewheeling position, the slide piston can take up pressure-reducing positions, in which the connection between the second main port and the first main port is automatically regulated and throttled during fluid flow from the second main port to the first main port. The pressure-reducing positions are taken up by the slide piston for braking the motor (acting as a pump). Furthermore, in a region of the valve bore that is adjacent to the pressure-reducing positions, the slide piston can take up pressure-limiting positions, in which the connection between the first main port and the second main port is automatically regulated and throttled during fluid flow from the first main port to the second main port. The latter positions make it possible for the brake valve according to the disclosure also to start to throttle a pressure medium flow which is directed from the variable displacement pump to a pressure protection means and is produced by a reversal of the feed direction of the variable displacement pump during the braking of the vehicle. The reversal of the feed direction can arise by the variable displacement pump being completely pivoted or locked by an operator who intuitively intends to brake the vehicle. The pressure protection means is a connection which opens to the second working line when a maximum pressure of the first working line in question is reached.

Further advantageous refinements of the disclosure are described in the description below.

In a particularly preferred development of the brake valve according to the disclosure, the main stage thereof is configured in such a manner that the pressure-reducing positions are arranged between the freewheeling position and the pressure-limiting positions. When a change is intended to be made from the normal mode to the braking mode, the slide piston can then be displaced out of the freewheeling position thereof rectilinearly and directly into the pressure-reducing positions. Furthermore, when a reversal in the direction of flow is intended to take place in the braking mode, the slide piston can be displaced rectilinearly and from the pressure-reducing positions to the pressure-limiting positions.

In a particularly preferred development, the slide piston bounds a control pressure space which is relievable of load via a pilot control stage to an externally conducted port of the pilot control stage or of the brake valve according to the disclosure. This avoids a pressure superelevation, in which the return pressure or support pressure in the first main port is added to the brake pressure, in the working line serving as the return line. A closing force of a valve body of the pilot control stage is adjustable via a switch-off stage. The brake pressure in the working line serving as the return line can therefore be adjusted.

In a preferred refinement, the switch-off stage has a control pressure port, via the control pressure of which a position of a switch-off piston, which determines a pretensioning of a pilot control spring, is adjusted. The brake pressure in the working line serving as the return line can therefore be regulated via the control pressure.

In a preferred development of the brake valve according to the disclosure, an increase in the control pressure causes the switch-off piston to be movable counter to the force of a switch-off spring, as a result of which the pilot control spring and therefore the valve body of the pilot control stage are relieved of load. The vehicle, into the drive system of which the brake valve according to the disclosure is fitted, is therefore braked on an increase of the control pressure.

In a preferred refinement, the first main port is arranged— preferably rotationally symmetrically and—adjacent to an end side of the slide piston, while the second main port is connected to an annular space which surrounds the slide piston.

In terms of device engineering, the slide piston can then be configured in a simple manner with a cup-like section, the base of which bounds the control pressure space, wherein a throttled connection between a cup interior and therefore the first main port and the control pressure space is formed in the base. A control edge, around which the flow passes in the pressure-limiting positions can be formed on a border of the cup-like section. A radial bore, preferably a radial bore star, through which the flow passes in the freewheeling position (without covering) and in the pressure-reducing positions (with covering) can be provided in a wall of the cup-like section.

In a simple manner in terms of device engineering, the border can form a stop for the freewheeling position of the slide piston in the main stage, wherein, in the freewheeling position, a comparatively weak main spring arranged in the control pressure space is maximally relaxed. This serves to push the slide piston into the freewheeling position when, during the normal mode of the drive system, low pressure prevails at the two main ports in the working line serving as the return line.

In order to guide the slide piston in the, or into the, pressure-reducing positions and, in particular, in the, or into the, freewheeling position, it is preferred if the slide piston has a circular cylindrical section which extends from the cup-like section in the direction of the control pressure space or into the control pressure space. The circular cylindrical section can then also be used for centering an end section of the main spring, said end section bearing against the base.

The retracting or load relief movement of the switch-off piston, which movement can be produced by the control pressure and is intended for braking the connected motor via the pressure-reducing positions can be made possible in such a manner that the slide piston can take up a position in which the radial bore or the radial bore star is completely closed. The boosting of the braking is therefore "maximized". This completely closed position is arranged between the pressure-reducing positions and the pressure-limiting positions of the slide piston.

If a stop of the switch-off piston is adjustable in the load relief direction of the pilot control spring, for example by means of a screw thread, a minimal opening of the radial bore or of the radial bore star, and therefore a maximum throttling and hence a permissible braking pressure can be limited.

The hydrostatic drive system according to the disclosure has a closed circuit which has a first and a second working line. A previously described brake valve or retarder valve, the first main port of which is connected to a variable displacement pump and the second main port of which is connected to a motor of the drive system, is arranged in the first working line. Furthermore, the drive system has a pressure protection means, by means of which, when a maximum pressure is reached, the first working line is relievable of load via a first connection to the second working line. The pressure protection means is connected between the brake valve and the motor to the working lines; i.e. is a motor-side pressure protection means. The pressure-limiting positions of the slide piston permit throttling also of a pressure medium flow from the variable displacement pump to the pressure protection means, said pressure medium flow being produced by a reversal of the feed direction of the variable displacement pump during the braking of the vehicle. The reversal of the feed direction can arise by complete pivoting or locking of the variable displacement pump by an operator who intuitively would like to brake the vehicle. The pressure protection means is a connection which opens to the second working line when a maximum pressure of the first working line in question is reached.

When the variable displacement pump has been completely pivoted in order to reverse the direction of travel, and when, via the pressure protection means, the second working line is also relievable of load to the first working line via a second connection when a maximum pressure is reached (alternating pressure protection means, mutual injection) than a second brake valve according to one embodiment is also preferred in the second working line. A first main port of the second brake valve is connected to the variable displacement pump and a second main port of the second brake valve is connected to the motor of the drive system. The abovementioned advantages of the drive system are then also provided after a reversal of the direction of travel by reversal of the feed direction of the variable displacement pump.

A control pressure port of the brake valve can be supplied with a control pressure by a feed pump of the circuit via a common or respective control-pressure-reducing valve.

The control-pressure-reducing valve and therefore the control pressure at the brake valve are preferably adjustable depending on a rotational speed sensor via which a rotational speed of an internal combustion engine, preferably a diesel motor, driving the variable displacement pump is detectable.

BRIEF DESCRIPTION OF THE DRAWINGS

An exemplary embodiment of the brake valve according to the disclosure and various exemplary embodiments of the drive system according to the disclosure are described in detail below with reference to the figures, in which FIG. 2 shows, in a longitudinal section, the exemplary embodiment from FIG. 1 in a pressure-reducing position, FIG. 3 shows, in a longitudinal section, the exemplary embodiment from the preceding figures in a pressure-limiting position.

DETAILED DESCRIPTION

Figure 1:
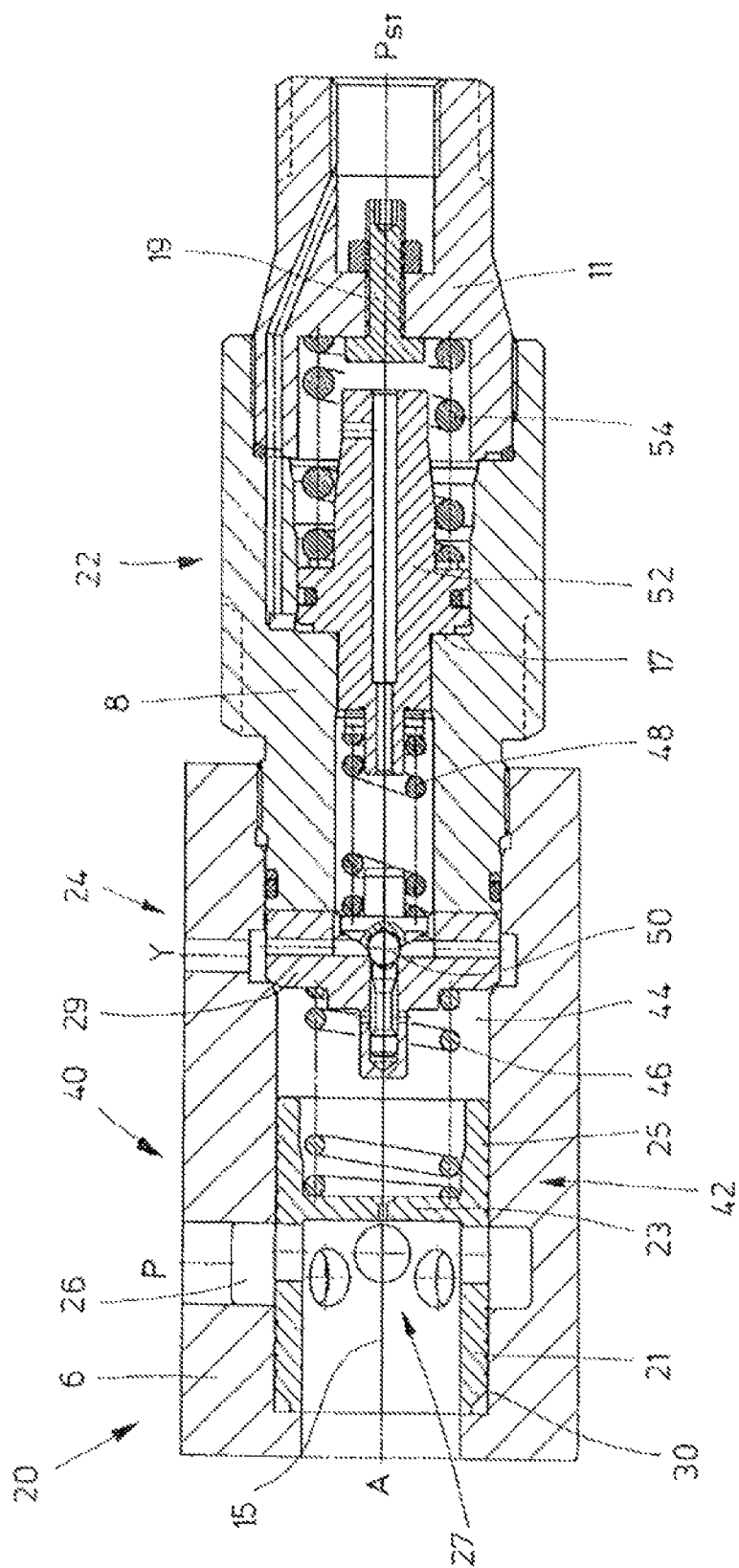
FIG. 1 shows, in a longitudinal section, the exemplary embodiment of the double-action brake valve according to the disclosure in a freewheeling position.

FIGS. 1 to 3 show the exemplary embodiment of the retarder valve or brake valve 20 according to the disclosure in various functional positions, in particular of the slide piston 42 thereof. The valve 20 has a housing part 6 which can be formed integrally with a housing of a variable displacement pump 1 (cf. FIGS. 4 to 8). A housing part 8 is screwed into the housing part 6, with an end housing part 11 being screwed, in turn, into said housing part 8. The valve 20 has a longitudinal axis 15 around which most of the components are formed or are arranged in a rotationally symmetrical manner.

A first main port A is arranged on the end side of the housing part 6, while a second main port P is arranged on the circumference of the housing part 6. The valve 20 is inserted via the two main ports A, P into a main line or a working line HA, HB of a hydrostatic drive system, wherein the first main port A is connected on the pump side and the second main port P is connected on the motor side (cf. FIGS. 4 to 8). An external port Y which is not in any interaction with the drive system is furthermore provided on the circumference of the housing part 6. Finally, a control pressure port $p_{st}$ is provided on the end side of the housing part 11. A switch-off stage 22 of the valve 20 is controlled via said control pressure port, wherein the closing force of a valve body 50, which is in the form of a ball, of a pilot control stage 24 is adjusted via the switch-off stage 22. The valve body 50 controls a connection or relieving of the load of a control pressure space 44 to the external port Y.

The switch-off stage 22 has a switch-off piston 52, the position of which in the housing part 8 determines a pretensioning of a pilot control spring 48 which acts in the closing direction of the valve body 50 of the pilot control stage 24. A switch-off spring 54 acts on the switch-off piston 52 in the direction of increasing the pretensioning of the pilot control spring 48, while an increase in the control pressure $p_{st}$ via an annular pressure space 17 acts in the direction of reducing the pretensioning of the pilot control spring 48. Said pretensioning is of minimal size in the basic position or freewheeling position shown in FIG. 1. The maximum relieving of load or relaxing of the pilot control spring 48 is limited by a stop 19 for the switch-off piston 52, the position of which in the housing part 11 can be adjusted via a screw thread. The stop 19 limits the load relief movement of the switch-off piston 52, which movement is directed to the right in FIGS. 1 to 3.

An approximately disk-like housing element 29 is clamped between the two housing parts 6 and 8, said housing element serving as a valve seat for the valve body 50 of the pilot control stage 24, and a connecting channel from the control pressure space 44 to the port Y being formed in said housing element. Furthermore, a comparatively weak main spring 46 which pretensions the slide piston 42 into the left stop position shown in FIG. 1 is supported on the housing element 29.

The slide piston 42 has a cup-like section 21, on the base 23 of which a circular cylindrical section 25 is integrally provided. A common outer casing of the cup-like section 21 and of the circular cylindrical section 25 is therefore circular cylindrical and is inserted into a correspondingly dimensioned valve bore of the housing part 6 so as to be displaceable along the longitudinal axis 15.

In the stop position which is shown in FIG. 1 and is referred to as the main position or freewheeling position, a radial bore star 27 of the cup-like section 21 is entirely arranged in the region of an annular space 26 which is formed in the housing part 6 and comprises the slide piston 42. The base 23 of the slide piston 42 is provided with a comparatively small bore or a nozzle via which the interior of the cup-like section 21 is in—temporally delayed—pressure medium connection to the control pressure space 44.

The slide piston 42 takes up the freewheeling position shown in FIG. 1 whenever substantially equal pressures prevail at the two main ports A, P, and therefore the main spring 46 becomes the decisive force on the slide piston 42. The pressure medium of the working line HA, HB in question can then either flow under high pressure without throttling from the first main port A to the second main port B, or said pressure medium can flow under low pressure without throttling in the reverse direction from the second main port P to the first main port A. During a normal journey of a vehicle (not shown) driven by the drive system, the two directions of flow arise in two different directions of travel. A comparatively low control pressure $p_{st}$ is present in this case at the control pressure port $p_{st}$.

FIG. 2 shows the brake valve 20 according to the disclosure in the state in which said brake valve serves for braking the motor 2; 102 connected to the second main port P (cf. FIGS. 4 to 8). The motor 2; 102 here acts as a pump and feeds pressure medium which is under high pressure via the second main port P to the slide piston 42. During the braking which can be undertaken by the vehicle driver or which is initiated, preferably automatically, by the drive system according to the disclosure (cf. FIGS. 4 to 8), the control pressure $p_{st}$ has to be increased. As a result the switch-off piston 52 is raised, and therefore the pilot control spring 48 is relieved of load, as a result of which the valve body 50 can relief the control pressure space 44 of load. By this means, the slide piston 42 moves, for example, into what is referred to as the pressure-reducing position which is shown in FIG. 2, wherein further pressure-reducing positions are possible adjacent to the pressure-reducing position shown. In all of the pressure-reducing positions, the pressure medium flowing from the second main port P to the first main port A and therefore back to the variable displacement pump 1 is throttled via the partially covered radial bore star 27. In order to boost said throttling and therefore the braking, the control pressure $p_{st}$ is increased, as a result of which the slide piston 42 is displaced further to the right in FIG. 2. In the exemplary embodiment shown, the movement of the switch-off piston 52 required for this purpose is limited by the stop 19.

If the vehicle driver, in addition to the braking which is carried out by the brake valve 20, intends to completely pivot the variable displacement pump 1 (cf. FIGS. 4 to 8), the brake valve 40 is switched into what are referred to as pressure-limiting positions, of which one is shown in FIG. 3. In the operating state of the brake valve 20 that is shown in FIG. 3, the starting point is that a pressure protection means 9 is provided between the brake valve 20 and the motor 2; 102 (cf. FIGS. 4 to 8). This is necessary so that the accumulated pressure medium flow firstly from the variable displacement pump 1 and secondly from the motor 2; 102 acting as a pump can jointly overflow to the low pressure side HB of the drive system. Then, by the variable displacement pump 1, the pressure medium flow shown in FIG. 3 from the first main port A to the second main port P is throttled by the brake valve 20 in one of the pressure-limiting positions thereof. An encircling control edge 30 which is formed on the cup-like section 21, on the border thereof that faces away from the base 23, serves for this purpose. In the pressure-limiting positions, the control pressure space 44 is comparatively small, and the radial bore star 27 is covered by the housing part 6.

Exemplary embodiments of travel drives for mobile working machines with closed circuits and with retarder circuits are explained with reference to FIGS. 4 to 8, in which the brake valve 20, according to FIGS. 1 to 3, is inserted into a first working line HA and optionally also into the other working line HB. For the sake of simplicity, the opposite brake valve is also provided with the reference number 20. The features which all of the travel drives according to FIGS. 4 to 8 have are first of all explained below. The differences thereof are then described.

FIGS. 4 to 8 each show a travel drive in which the variable displacement pump 1, which is configured, for example, as an axial piston pump, is driven by an internal combustion engine (not shown) via a drive shaft such that, via said internal combustion engine, during the braking, a drag torque which assists the braking operation is applied. The variable displacement pump 1 is adjusted via an adjustment cylinder 68 which is activated via a control device 70 placed thereon. Said control device has a proportionally adjustable regulating valve which is adjustable electrically or electro-hydraulically.

The motor-side, alternating pressure protection means 9 that has already been mentioned is provided for protecting the respective working line HA or HB conducting high pressure. Said pressure protection means is configured with two maximum pressure-limiting valves 12, 14 having a sucking-up function, which are arranged in a common bypass line 10 connecting the two working lines HA, HB to each other. When a set pressure in the working line HA or in the working line HB is exceeded, a pressure medium connection to the respectively other working line HB or HA is opened for load relief.

A feed pump 4 which produces a control pressure required for adjusting the adjustment cylinder 68 also sits on the drive shaft connecting the internal combustion engine to the variable displacement pump 1. The control pressure in the feed line 3 is limited via a pressure cut-off valve 76 which ensures that, during acceleration or braking operations, the pressure protection means 9 does not respond in an undesirable manner. The feed line 3 leads via two pump-side feed valves 5, 7 into the respective working line HA, HB.

The closed circuits according to FIGS. 4 to 8 are furthermore configured with a flushing valve 16, wherein a flushing nozzle 18 is configured so as to be electrically adjustable. Said electric adjustment takes place as a function of the rotational speed n of the variable displacement pump 1, said rotational speed being detected via a rotational speed sensor 82. Depending on the rotational speed n, the opening cross section of the flushing nozzle 18 is then adjusted via a control unit 84. According to the disclosure, said adjustment takes place in such a manner that the opening cross section is enlarged during the braking.

The control pressure $p_{st}$ is set via a first and optionally via a second control-pressure-reducing valve 78; 178 via which, in principle, the control pressure for the adjustment cylinder 68 is also reducible. However, in the solutions illustrated, the control-pressure-reducing valves 78; 178 serve only for setting the control pressure $p_{st}$ which is tapped off via a control line 80 and conducted to the switch-off stage 22.

As mentioned, the first and optionally the second brake valve 20 are configured as a pressure-reducing valve which, in the normal driving state, opens with a full nominal width. For the braking, the volumetric flow of pressure medium in the working line HA, HB serving as an outlet is throttled and therefore the motor 2; 102 is braked. This braking operation is assisted by the drag torque of the internal combustion engine. Virtually any internal combustion engine/pump characteristic can be electronically regulated in accordance with the setting of the flushing valve 16 and of the control-pressure-reducing valve 78; 178.

Figure 4:
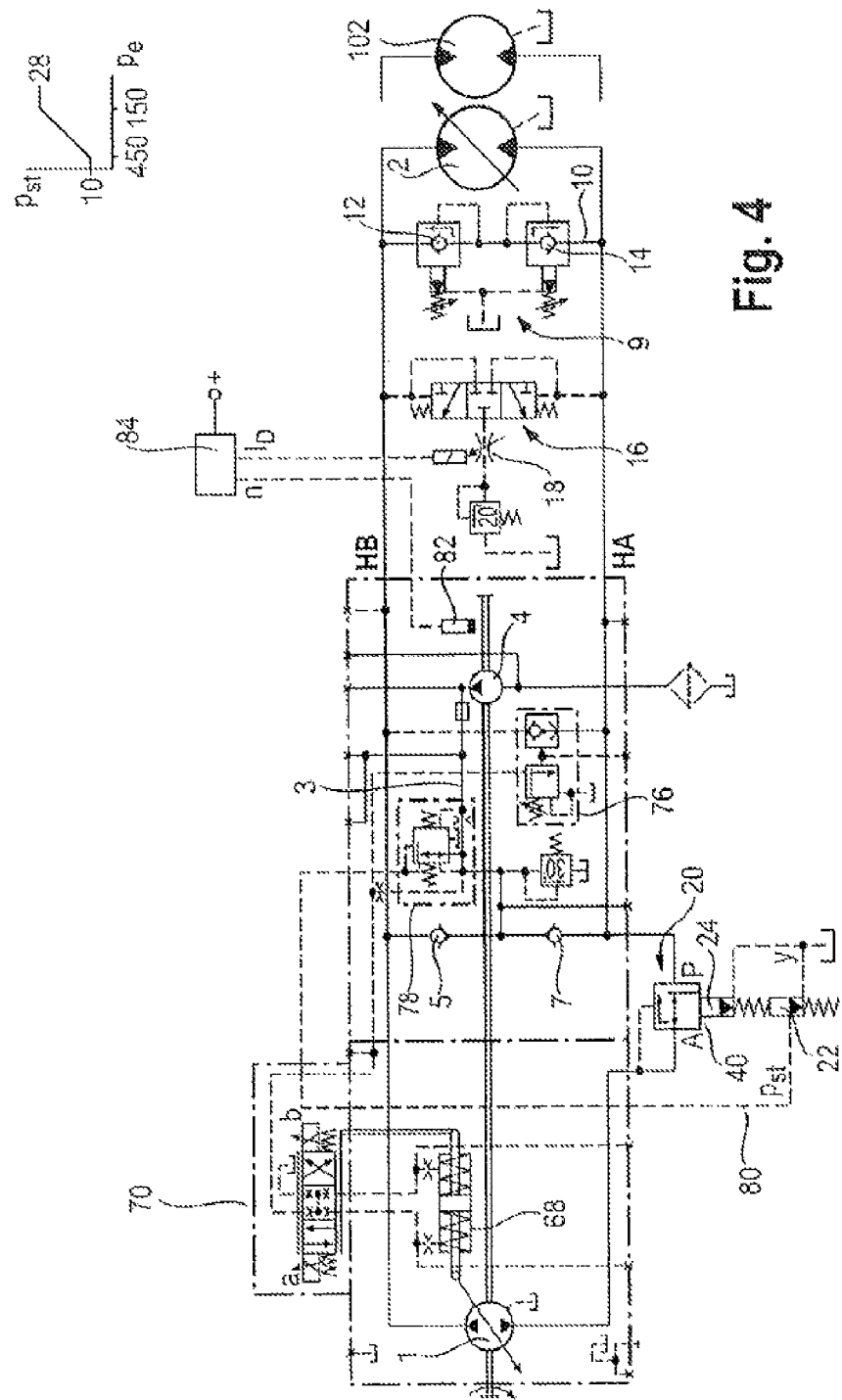
FIG. 4 shows a first exemplary embodiment of the hydrostatic drive system according to the disclosure with the brake valve according to the preceding figures.
Figure 5:
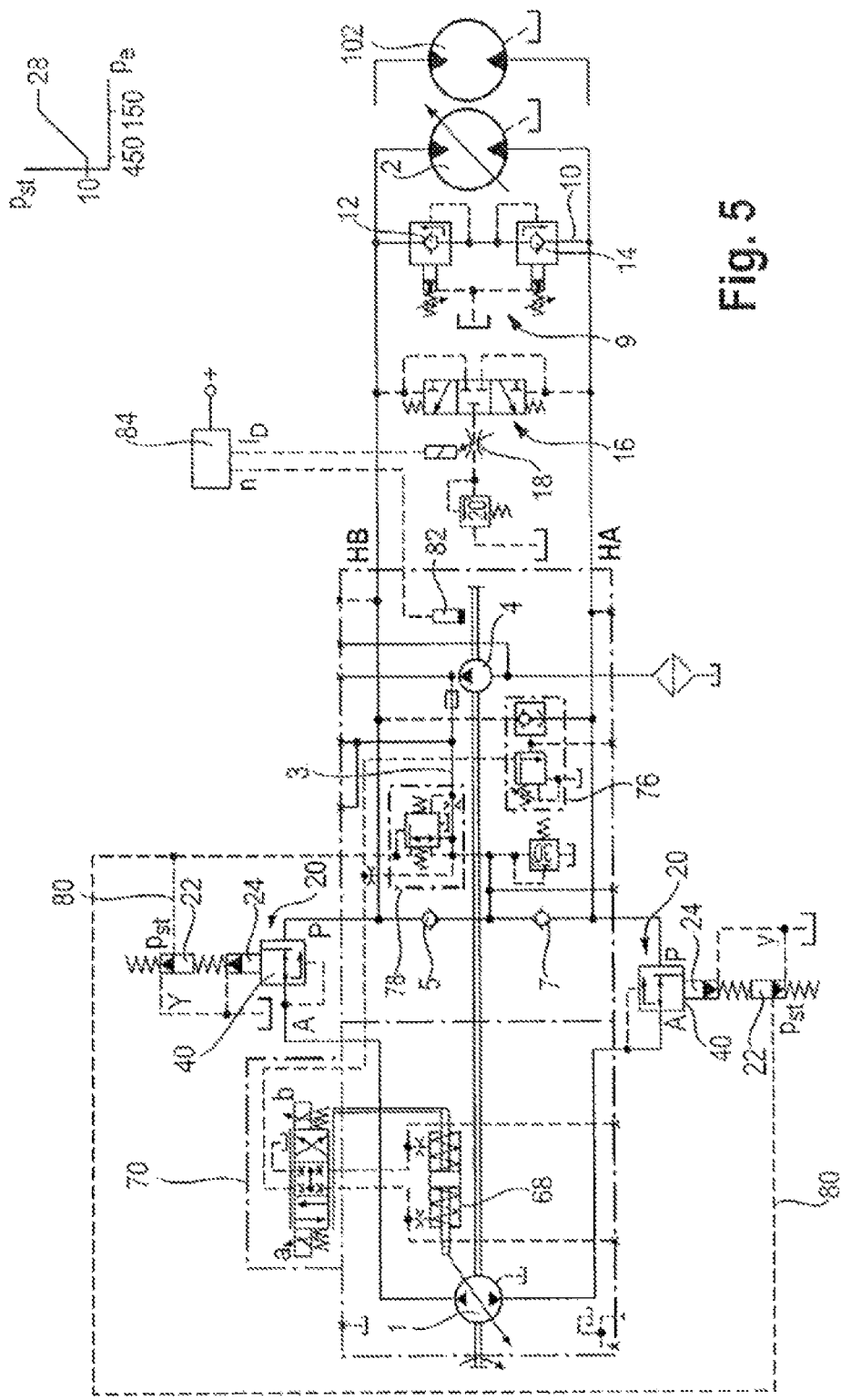
FIG. 5 shows a second exemplary embodiment of the hydrostatic drive system according to the disclosure with the brake valve according to FIGS. 1 to 3.

FIG. 5 shows a second exemplary embodiment of the travel drive according to the disclosure that substantially corresponds to that from FIG. 4. In addition, a second brake valve 20 according to FIGS. 1 to 3, which is structurally identical to the previously described brake valve 20, is arranged in the second working line HB. The switch-off stage 22 of the second brake valve 20 is charged via a second control line 80 with the control pressure $p_{st}$ set at the control-pressure-reducing valve 78, and therefore the same control pressure $p_{st}$ is present for the two brake valves 20.

Figure 6:
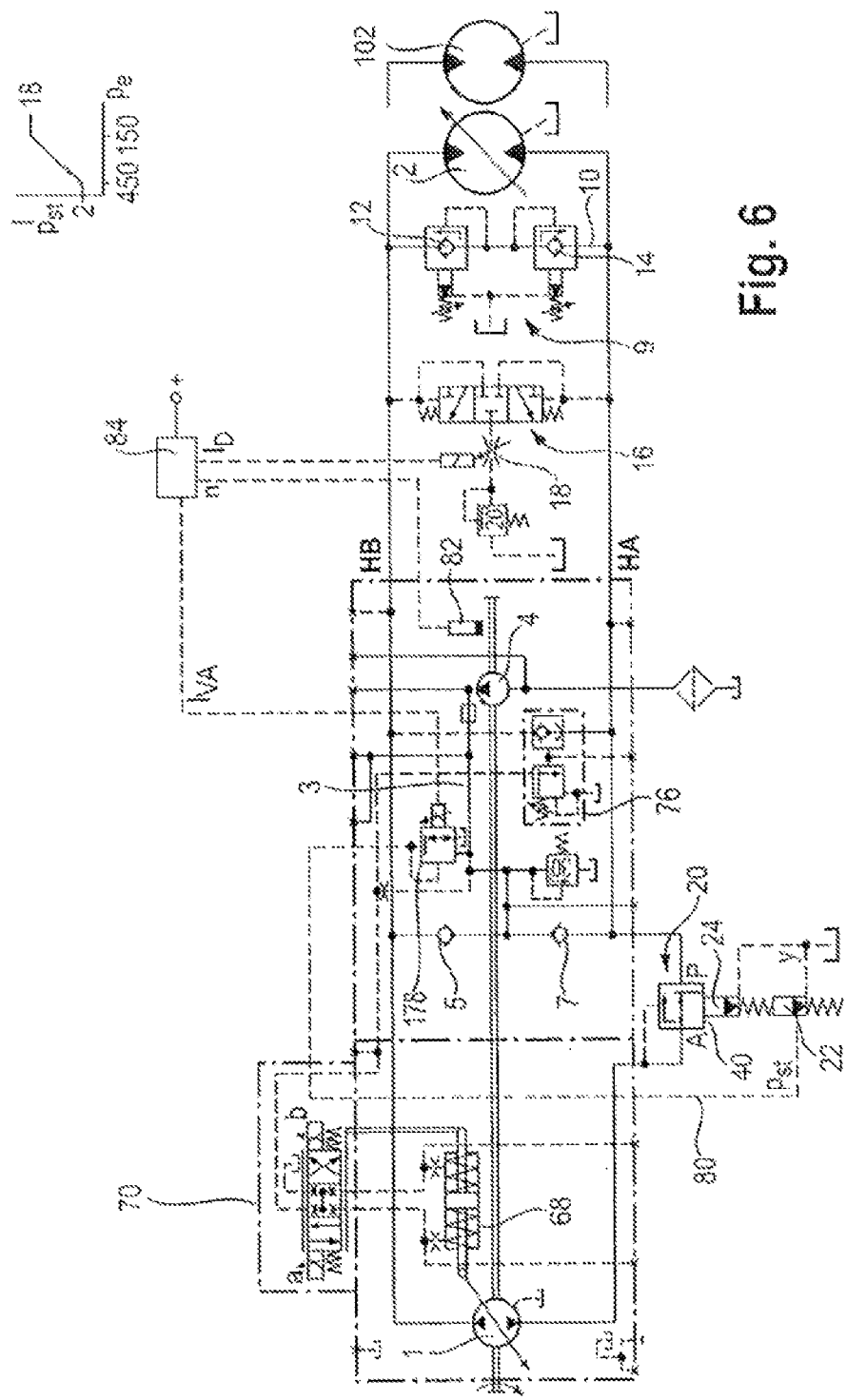
FIG. 6 shows a third exemplary embodiment of the hydrostatic drive system according to the disclosure with the brake valve according to FIGS. 1 to 3.

FIG. 6 shows an exemplary embodiment corresponding in basic configuration to FIG. 4. In the latter, the control-pressure-reducing valve 78 is set to a fixed value. FIG. 6 shows an exemplary embodiment in which the control-pressure-reducing valve 178 is controlled electro-proportionally. The activation takes place here via the control unit 84 via which the control device 70 and the electrically adjustable flushing nozzle 18 are also activatable. The opening cross section of said flushing nozzle can be activated in turn depending on the rotational speed n of the variable displacement pump 1 or of the internal combustion engine. Accordingly, a rotational-speed-dependent or pressure-dependent adjustment of the control-pressure-reducing valve 178 is also possible. Virtually any characteristics can be set by said electro-proportional control of the control-pressure-reducing valve 178. One characteristic is shown by way of example in FIG. 6.

Figure 7:
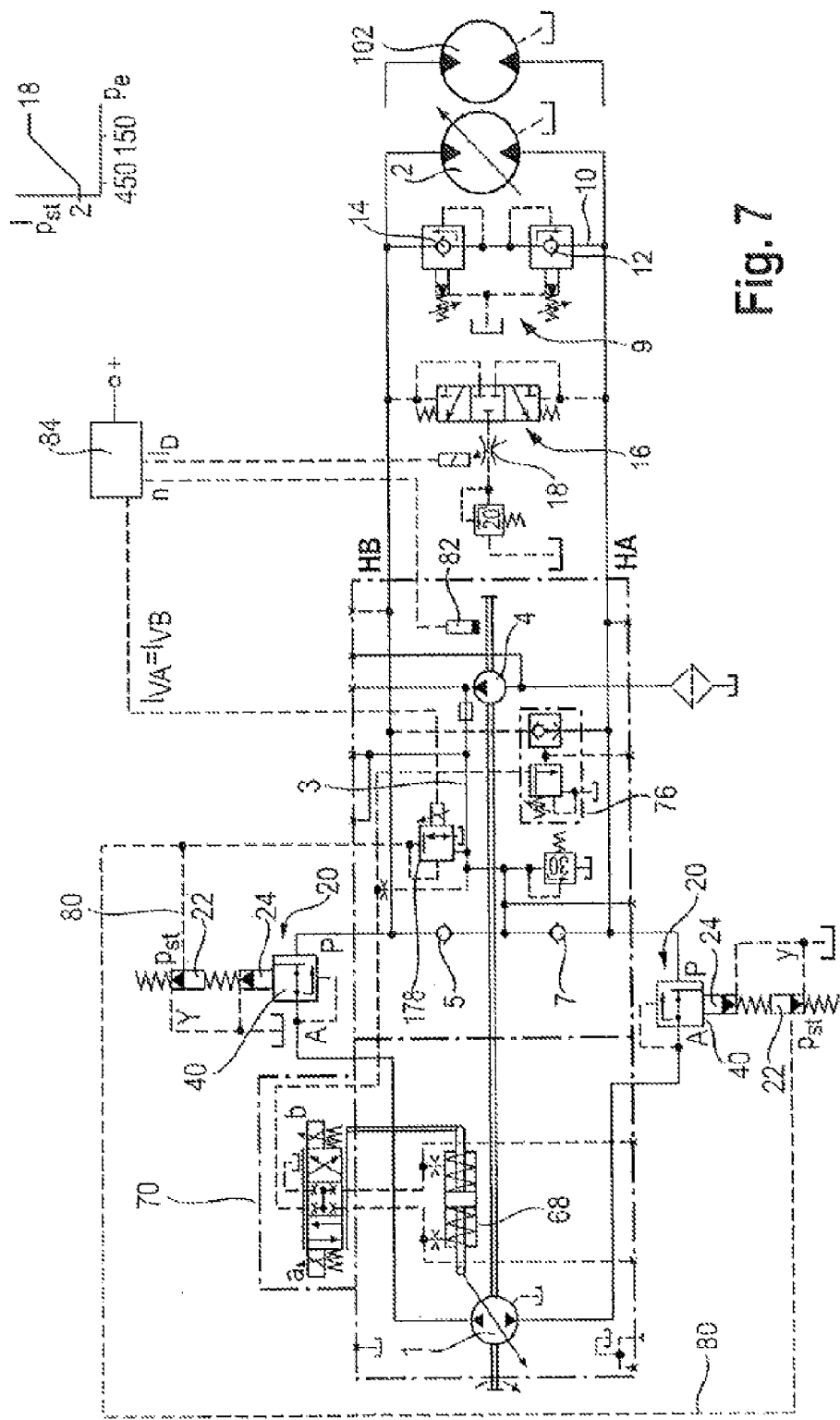
FIG. 7 shows a fourth exemplary embodiment of the hydrostatic drive system according to the disclosure with the brake valve according to FIGS. 1 to 3.

FIG. 7 shows a fourth exemplary embodiment, largely corresponding to FIG. 6, of the travel drive according to the disclosure, in which, in addition, a second brake valve 20 according to FIGS. 1 to 3, which are structurally identical to the previously described brake valve 20, is arranged in the second working line HB. The switch-off stage 22 of the second brake valve 20 is charged via a second control line 80 with the control pressure $p_{st}$ set at the control-pressure-reducing valve 178, and therefore the same control pressure $p_{st}$ is present for the two brake valves 20.

Figure 8:
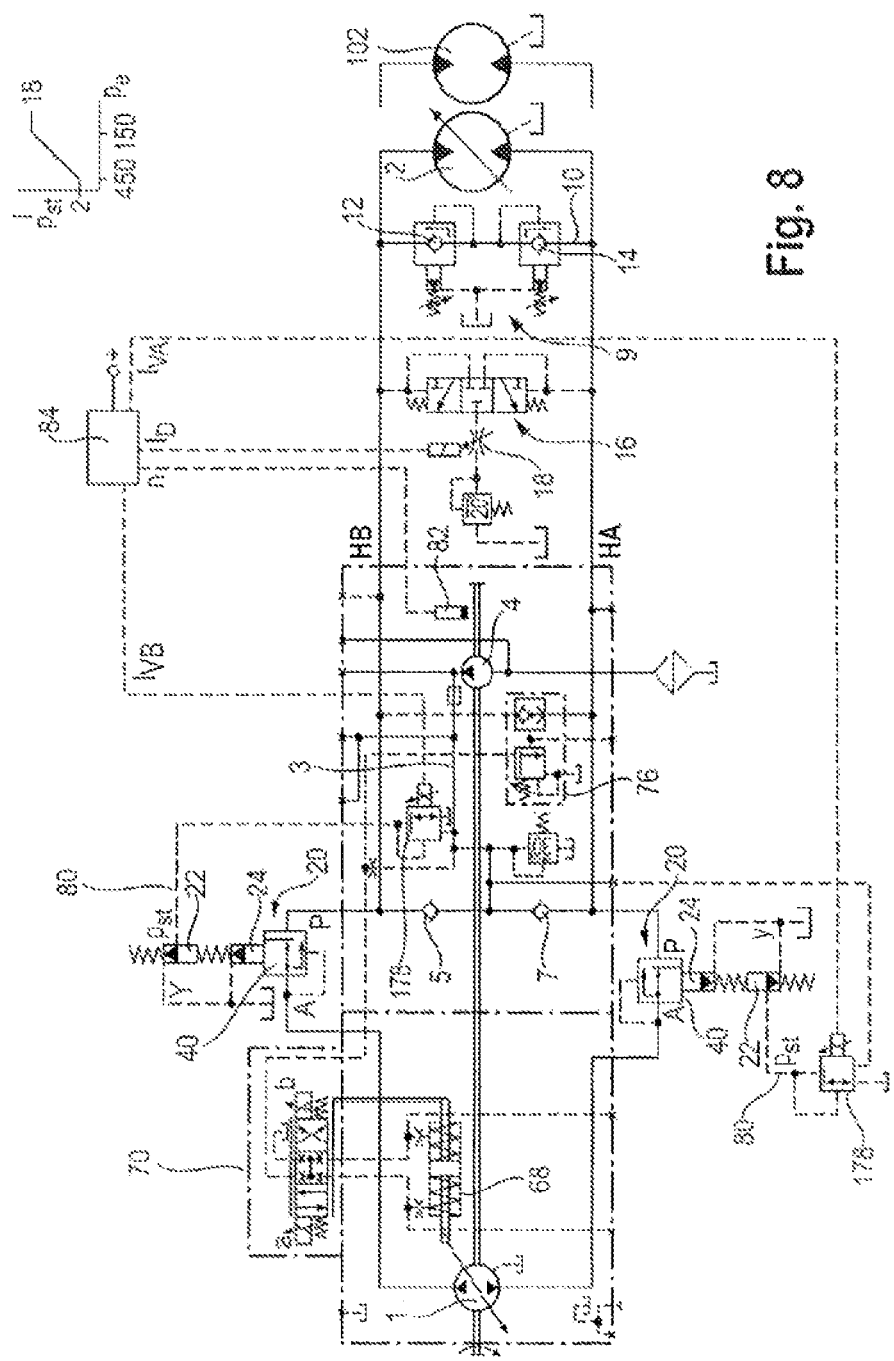
FIG. 8 shows a fifth exemplary embodiment of the hydrostatic drive system according to the disclosure with the brake valve according to FIGS. 1 to 3.

FIG. 8 shows a fifth exemplary embodiment of the travel drive according to the disclosure with brake valves 20 in the two working lines HA, HB, wherein the activation of the switch-off stages 22 thereof takes place electro-proportionally similarly as in the case of the two exemplary embodiments described. In this case, a separate control-pressure-reducing valve 178 is provided for each brake valve 20, said control-pressure-reducing valve being set electro-proportionally by the control unit 84 via different signals $I_{VA}$, $I_{VB}$. That is to say, the two brake valves 20 can be set individually, and therefore different characteristics are settable in the respective outlet depending on the direction of rotation of the motor 2; 102.

The brake valve 20 or retarder valve according to the disclosure is used in the closed circuit for delaying or stopping motors 2; 102. Even in the case of drives without an effective support torque (electric motor, transmission with freewheeling), a tractive load can be reliably braked. The system is highly flexible and adapted to each motor situation and brakes virtually any variable displacement motor 2 in the regulating phase thereof. An uncontrolled closing of a brake element, as is possible in conventional solutions, is prevented by the concept according to the disclosure. The braking operation is initiated during the reversal of pressure (motor 2; 102 runs at a higher speed) until the complete frictional connection is provided again. The brake valve 20 is simple, robust, cheap, very compact and does not require any cross-sectional adaptation to the braking torque. It is able to be integrated in the motor 2; 102 or in a control block and takes on the pressure protection in the closed circuit.

If the housing part 8 is released somewhat from the housing part 6 due to the housing part 8 revolving a number of times in relation to the housing part 6, the housing element 29 closing the control pressure space 44 is released and therefore the control pressure space 44 is relieved of load directly to the port Y. The pilot control stage 24 and the switch-off stage 22 do not influence said load relief here. This provides a hydraulic short circuit via which the vehicle, for example, can be towed away.

In a departure from the exemplary embodiment shown in FIGS. 1 to 3, the adjustable stop of the switch-off stage of the brake valve 20 may be omitted.

A double-action brake valve or retarder valve, which is configured as a combined pressure-reducing valve (DRE) and pressure-limiting valve (DB) and can be inserted into a working line of a hydrostatic travel drive, for example for a mobile working machine, is disclosed. Furthermore, a travel drive of this type is disclosed. The working line in question serves as a return line in a normal driving mode. The brake valve has a main stage which has a first main port, which is connected to a variable displacement pump of the drive system, and a second main port, which is connected to a motor of the drive system. The main stage has a slide piston which can take up a freewheeling position or a main position in a valve bore of the main stage, in which a connection is maximally open with minimal throttling between the two main ports. Furthermore, the slide piston can take up pressure-reducing positions, in which a regulable, throttled connection from the second main port to the first main port is open. The pressure-reducing positions can be taken up by the slide piston in order to brake the motor (acting as a pump). Finally, the slide piston can take up pressure-limiting positions, in which a regulable, throttled connection from the first main port to the second main port is open. The latter positions make it possible for the brake valve also to begin to throttle a pressure medium flow, which is reversed with respect to the return direction, from the variable displacement pump to a pressure protection means. The freewheeling position, the pressure-reducing positions and the pressure-limiting positions lie on a center line of a main stage of the brake valve, along which center line the slide piston is movable.

What is claimed is:

1. A brake valve configured to be positioned in a working line of a hydrostatic drive system, the brake valve comprising:
   a main stage including:
      a first main port configured to be connected to a variable displacement pump of the drive system;
      a second main port configured to be connected to a motor of the drive system; and
      a slide piston configured to be selectively positioned in (i) a freewheeling position, in which a first connection between the first and second main ports is open, (ii) pressure-reducing positions in which the first connection is throttled during fluid flows from the second main port to the first main port so as to control the pressure in the first main port, and (iii) pressure-limiting positions in which the slide piston is acted upon by a pressure in the first main port so as to position the slide piston such that the first connection is throttled during fluid flows from the first main port to the second main port so as to delimit the pressure in the first main port.

2. The brake valve according to claim 1, wherein the pressure-reducing positions are arranged between the freewheeling position and the pressure-limiting positions.

3. The brake valve according to claim 1, wherein the first main port is arranged adjacent to an end side of the slide piston and the second main port is connected to an annular space extending around the slide piston.

4. A brake valve configured to be positioned in a working line of a hydrostatic drive system, the brake valve comprising:
   a main stage including:
      a first main port configured to be connected to a variable displacement pump of the drive system;
      a second main port configured to be connected to a motor of the drive system; and
      a slide piston configured to be selectively positioned in (i) a freewheeling position, in which a first connection between the first and second main ports is open, (ii) pressure-reducing positions in which the first connection is throttled during fluid flows from the second main port to the first main port, and (iii) pressure-limiting positions in which the first connection is throttled during fluid flows from the first main port to the second main port, the slide piston partially defining a control pressure space;
   a pilot control stage operably connected to the control pressure space and including a valve body and an external port configured to relieve a load in the control pressure space; and
   a switch-off stage operably connected to the pilot control stage and configured to adjust a closing force on the valve body.

5. The brake valve according to claim 4, wherein:
   the pilot control stage further comprises a pilot control spring operably connected to the valve body; and
   the switch-off stage further comprises a switch-off spring, a switch-off piston operably connected to the pilot control spring and the switch-off spring, and a control pressure port through which, in the pressure-reducing positions of the slide valve, a control pressure is applied to the switch-off piston to move the switch-off piston counter to a force of the switch-off spring to relieve the pilot control spring and the valve body of the load.

6. The brake valve according to claim 5, wherein the switch-off stage further comprises a stop configured to limit a position of the switch-off piston, and the stop is adjustable.

7. The brake valve according to claim 4, wherein:
   the slide piston has a cup-like section with a base, the base partially defining the control pressure space;
   a second connection between the first main port and the control pressure space is defined through the base;
   a control edge, which throttles the first connection in the pressure-limiting positions, is formed on an end of the cup-like section remote from the base; and
   at least one radial bore defined in a wall of the cup-like section and through which the first connection is established in the freewheeling position and in the pressure-reducing positions.

8. The brake valve according to claim 7, wherein:
   the end forms a stop for the freewheeling position; and a main spring is arranged in the control pressure space and is maximally relaxed in the freewheeling position.

9. The brake valve according to claim 8, wherein the slide piston has a circular cylindrical section extending from the cup-like section in a direction toward the control pressure space and in which an end section of the main spring is arranged bearing against the base.

10. The brake valve according to claim 4, wherein, in the pressure-reducing positions, the first connection is throttled so as to control the pressure in the first main port and, in the pressure-limiting positions, the first connection is throttled so as to delimit the pressure in the first main port.

11. A hydrostatic drive system comprising:
a variable displacement pump;
a motor;
a closed circuit which has a first working line connecting the pump to the motor and a second working line connecting the pump to the motor;
a first brake valve arranged in the first working line, the first brake valve including:
a main stage having a first main port connected to the variable displacement pump, a second main port connected to the motor, and a slide piston configured to be selectively positioned in (i) a freewheeling position, in which a first connection between the first and second main ports is open, (ii) pressure-reducing positions in which the first connection is throttled during fluid flows from the first main port to the second main port so as to control the pressure in the first main port, and (iii) pressure-limiting positions in which the slide piston is acted upon by a pressure in the first main port so as to position the slide piston such that the first connection is throttled during fluid flows from the first main port to the second main port to delimit the pressure in the first main port; and
a pressure protection mechanism configured to relieve a first load of the first working line to the second working line when a maximum pressure is reached in the first working line,
wherein the pressure protection mechanism is connected to the first working line between the first brake valve and the motor.

12. The hydrostatic drive system according to claim 11, further comprising:
a second brake valve arranged in the second working line, the second brake valve being substantially identical to the first brake valve,
wherein the pressure protection mechanism is configured to relieve a second load of the second working line to the first working line when a maximum pressure is reached in the second working line.

13. A hydrostatic drive system comprising:
a variable displacement pump;
a motor;
a closed circuit which has a first working line connecting the pump to the motor and a second working line connecting the pump to the motor;
a first brake valve arranged in the first working line, the first brake valve including:
a main stage having a first main port connected to the variable displacement pump, a second main port connected to the motor, and a slide piston configured to be selectively positioned in (i) a freewheeling position, in which a first connection between the first and second main ports is open, (ii) pressure-reducing positions in which the first connection is throttled during fluid flows from the second main port to the first main port, and (iii) pressure-limiting positions in which the first connection is throttled during fluid flows from the first main port to the second main port, the slide piston partially defining a control pressure space;
a pilot control stage operably connected to the control pressure space and including a valve body and an external port configured to relieve a load in the control pressure space; and
a switch-off stage operably connected to the pilot control stage and configured to adjust a closing force of the valve body; and
a pressure protection mechanism configured to relieve a first load of the first working line to the second working line when a maximum pressure is reached in the first working line,
wherein the pressure protection mechanism is connected to the first working line between the first brake valve and the motor.

14. The hydrostatic drive system according to claim 13, wherein, in the pressure-reducing positions, the first connection is throttled so as to control the pressure in the first main port and, in the pressure-limiting positions, the first connection is throttled so as to delimit the pressure in the first main port.

15. The hydrostatic drive system according to claim 13, further comprising:
a feed pump configured to generate a control pressure; and
a control-pressure-reducing valve operably connected to the feed pump,
wherein the switch-off stage of the first brake valve includes a control pressure port operably connected to the control-pressure-reducing valve, the control pressure port being configured to be charged with the control pressure via a control-pressure-reducing valve to adjust the closing force of the valve body.

16. The hydrostatic drive system according to claim 15, wherein a valve position of the control-pressure-reducing valve is configured to be adjusted depending on a rotational speed sensor configured to detect a rotational speed of an internal combustion engine driving the variable displacement pump.

* * * * *